(12) United States Patent
Nakajima et al.

(10) Patent No.: US 7,775,060 B2
(45) Date of Patent: Aug. 17, 2010

(54) DRIVE UNIT FOR ELECTRIC VEHICLE

(75) Inventors: Yuki Nakajima, Yokohama (JP);
Masahiro Tsukamoto, Yokohama (JP);
Masakazu Kobayashi, Kanagawa (JP);
Yutaro Kaneko, Yokohama (JP);
Hiroyuki Kaneko, Yokohama (JP);
Toshiro Shinohara, Kanagawa (JP);
Makoto Iwashima, Kanagawa (JP);
Yasuhiko Kitajima, Kanagawa (JP);
Akihiro Hanamura, Yokohama (JP);
Kouichirou Yonekura, Kanagawa (JP);
Tadayuki Hatsuda, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 663 days.

(21) Appl. No.: 10/785,197

(22) Filed: Feb. 25, 2004

(65) Prior Publication Data
US 2004/0163409 A1 Aug. 26, 2004

(30) Foreign Application Priority Data
Feb. 25, 2003 (JP) ............................. 2003-047083

(51) Int. Cl.
*F25D 23/12* (2006.01)
(52) U.S. Cl. ....................................... 62/259.2; 62/505
(58) Field of Classification Search ............... 62/259.2, 62/243, 277, 238.6, 435, 452, 505, 3.4, 3.62, 62/3.64; 165/41, 104.31, 42, 104.33; 318/471, 318/472; 361/699, 701; 60/618, 671; 239/135, 239/412, 417.3, 600
See application file for complete search history.

(56) References Cited

U.S. PATENT DOCUMENTS

| | | | | |
|---|---|---|---|---|
| 3,548,612 A | * | 12/1970 | Mitsubayashi et al. | 62/469 |
| 3,721,108 A | * | 3/1973 | Kocher | 62/470 |
| 3,830,289 A | * | 8/1974 | Olson | 165/51 |
| 4,125,345 A | * | 11/1978 | Yoshinaga et al. | 417/243 |
| 4,399,774 A | * | 8/1983 | Tsutsumi | 123/41.1 |
| 4,576,555 A | * | 3/1986 | Ashenfelter | 417/372 |
| 4,961,595 A | * | 10/1990 | Fukushima et al. | 280/5.51 |
| 5,217,085 A | * | 6/1993 | Barrie et al. | 184/104.1 |
| 5,255,733 A | * | 10/1993 | King | 165/299 |
| 5,732,769 A | * | 3/1998 | Staffa | 165/154 |
| 5,834,132 A | * | 11/1998 | Hasegawa et al. | 429/62 |
| 6,166,498 A | * | 12/2000 | Yamaguchi et al. | 318/34 |
| 6,169,345 B1 | | 1/2001 | Bloch et al. | |
| 6,201,365 B1 | * | 3/2001 | Hara et al. | 318/558 |
| 6,263,960 B1 | * | 7/2001 | Yamanaka et al. | 165/119 |
| 6,323,613 B1 | * | 11/2001 | Hara et al. | 318/471 |

(Continued)

FOREIGN PATENT DOCUMENTS

DE 4139997 A1 * 7/1992

(Continued)

*Primary Examiner*—Mohammad M Ali
(74) *Attorney, Agent, or Firm*—Foley & Lardner LLP

(57) ABSTRACT

A drive unit for an electric vehicle is comprised of a motor, an inverter which supplies alternating current electric power to the motor, a speed reducer which is connected to the motor, and a cooling system which cools the motor, the inverter and the speed reducer. The speed reducer reduces a revolution speed of a mechanical output of the motor. The cooling system comprises a heat exchanger at which first refrigerant for receiving heat of at least one of the motor and the inverter receives heat of second refrigerant for receiving heat of at least one of the motor and the speed reducer.

16 Claims, 6 Drawing Sheets

U.S. PATENT DOCUMENTS

| | | | |
|---|---|---|---|
| 6,481,230 B2 * | 11/2002 | Kimishima et al. | 62/239 |
| 6,568,494 B2 * | 5/2003 | Takahashi | 180/68.4 |
| 6,595,271 B2 * | 7/2003 | Komoda | 165/133 |
| 6,736,753 B2 * | 5/2004 | Endo et al. | 477/3 |
| 2002/0066552 A1 * | 6/2002 | Komoda | 165/170 |
| 2002/0175008 A1 | 11/2002 | Angerer et al. | |
| 2004/0045749 A1 * | 3/2004 | Jaura et al. | 180/65.2 |

FOREIGN PATENT DOCUMENTS

| | | |
|---|---|---|
| EP | 0 660 492 A1 | 6/1995 |
| EP | 0 858 145 A2 | 8/1998 |
| EP | 1 049 234 A2 | 11/2000 |
| GB | 1 448 824 | 9/1976 |
| JP | 7-298552 A | 11/1995 |
| JP | 3271416 B2 | 1/2002 |

* cited by examiner

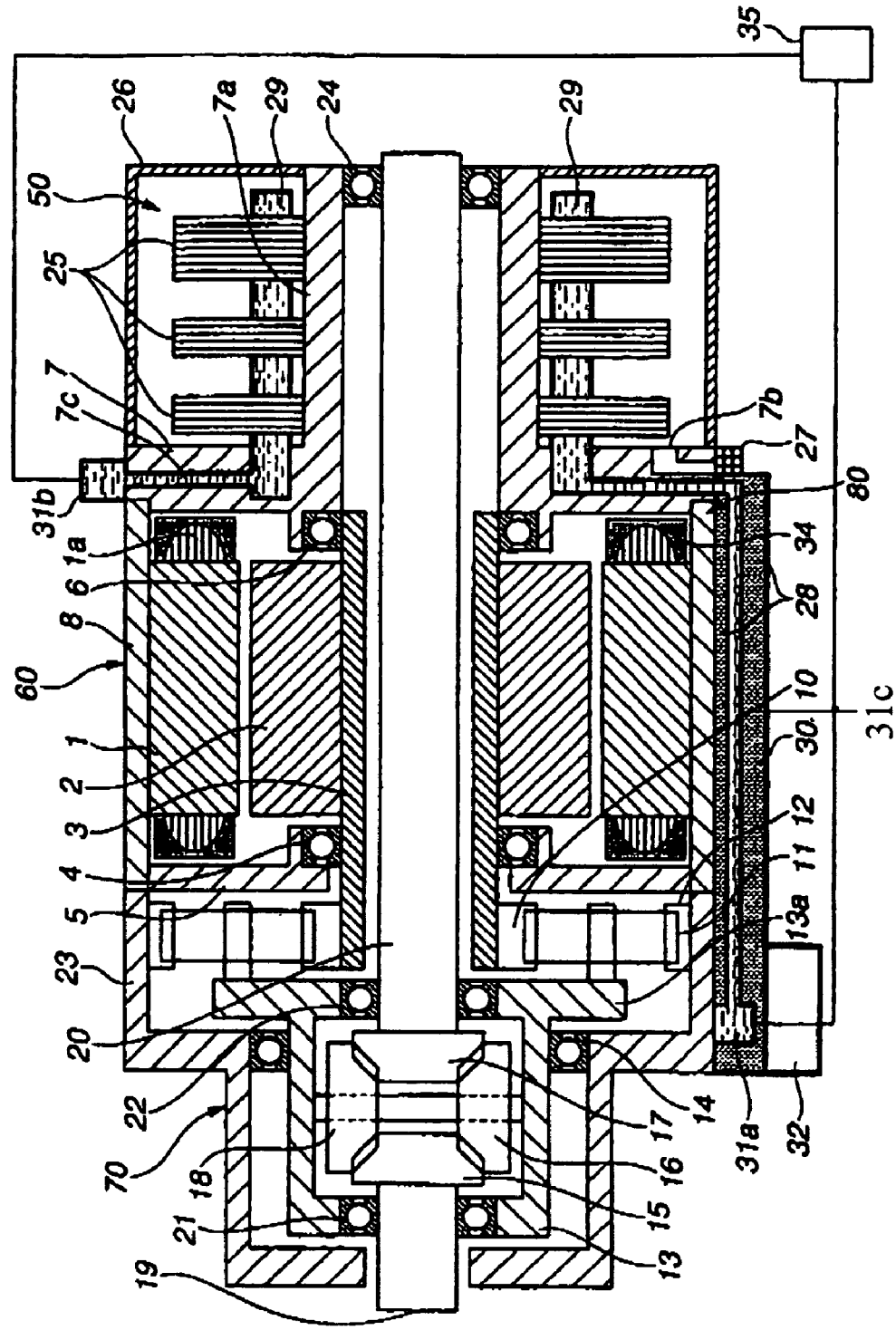
FIG.1 (Amended)

DRIVE UNIT FOR ELECTRIC VEHICLE

BACKGROUND OF THE INVENTION

The present invention relates a drive unit for an electric vehicle which unit comprises a motor, an inverter and a speed reducer which are integrally supported by a structural member.

Japanese Patent No. 3271416 discloses a drive unit for an electric vehicle, in which a motor and an inverter are coaxially and integrally arranged and are cooled by a cooling device built in the inverter using one kind of refrigerant.

SUMMARY OF THE INVENTION

However, the cooling device of the inverter cools a surface of the motor which faces with the inverter, and therefore a cooling efficiency of the drive unit is not satisfactory.

It is therefore an object of the present invention to provide an electric-vehicle drive unit which performs a high cooling efficiency.

An aspect of the present invention resides in a drive unit which is for an electric vehicle and which comprises a motor; an inverter supplying alternating current electric power to the motor; a speed reducer reducing a revolution speed of a mechanical output of the motor; first refrigerant receiving heat of at least one of the motor and the inverter and outputting the heat into the atmosphere; second refrigerant receiving heat of at least one of the motor and the speed reducer and outputting the heat to the first refrigerant, a cooling performance of the first refrigerant being higher than a cooling performance of the second refrigerant; and a heat exchanger transferring the heat of the second refrigerant to the first refrigerant.

Another aspect of the present invention resides in a drive unit for an electric vehicle. The drive unit comprises a motor, an inverter, a speed reducer and a cooling system. The inverter is electrically connected to the motor, the inverter supplying alternating current electric power to the motor. The speed reducer is connected to the motor. The speed reducer reduces a revolution speed of a mechanical output of the motor. The cooling system comprises a first refrigerant passage in contact with at least one of the motor and the inverter, a second refrigerant passage in contact with at least one of the motor and the speed reducer, a heat exchanger connected to the first refrigerant passage and the second refrigerant passage, a radiating section connected to the first refrigerant passage and the heat exchanger and radiating heat into the atmosphere, first refrigerant circulating the first refrigerant passage, the heat exchanger and the radiating section, the first refrigerant receiving heat at the first refrigerant passage and the heat exchanger and radiating the heat at the radiating section, and second refrigerant circulating the second refrigerant passage and the heat exchanger, the second refrigerant receiving heat at the second refrigerant passage and radiating the heat at the heat exchanger.

The other objects and features of this invention will become understood from the following description with reference to the accompanying drawings.

BRIEF DESCRIPTION OF THE DRAWINGS

FIG. 1 is a cross sectional view showing a drive unit of a first embodiment according to the present invention.

DETAILED DESCRIPTION OF THE INVENTION

Figure 2:
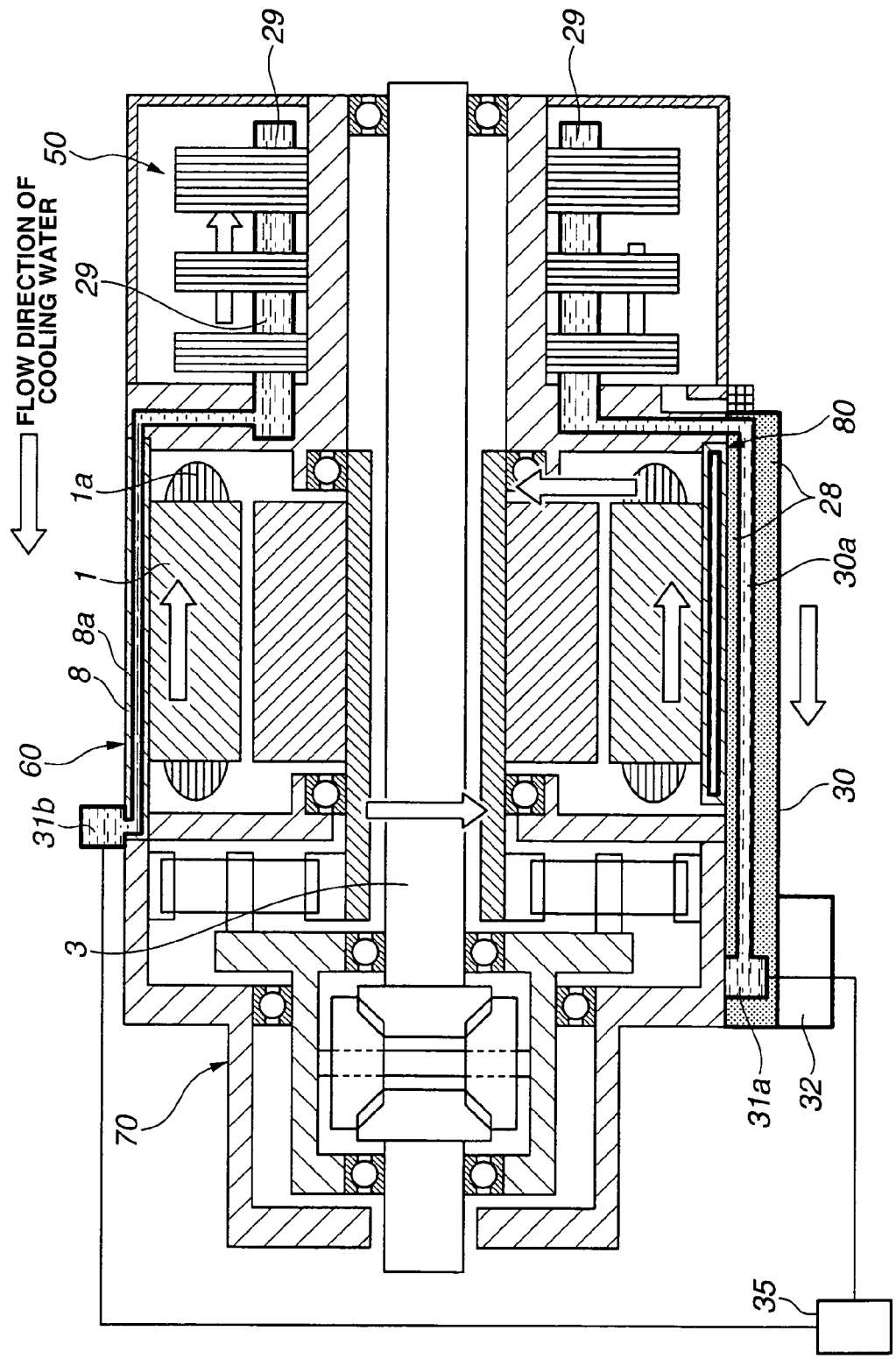
FIG. 2 is a cross sectional view showing the drive unit of a second embodiment according to the present invention.

Referring to the drawings, there are discussed embodiments of a drive unit for an electric vehicle in accordance with the present invention. Throughout the explanation of the embodiments, elements performing the same functions are denoted by the same reference numerals, and the repetition of their explanation is omitted. Further, in FIGS. 2 through 6, only elements to be specifically explained are denoted by reference numerals, and the reference numerals of the other elements are basically omitted.

FIG. 1 is a cross-sectional view of a drive unit of an electric vehicle according to a first embodiment of the present invention. Referring to FIG. 1, there is discussed the first embodiment of the drive unit.

As shown in FIG. 1, an inverter 50, a motor 60 and a differential speed reducer (speed reducer) 70 are aligned on an axis in the order of mentioned from a right hand side on FIG. 1. Inverter 50 supplies alternating-current electric power to motor 60 to drive motor 60. Differential speed reducer 70 reduces the speed of the mechanical output of motor 60 and distributes the mechanical output to left and right drive shafts 19 and 20. Stators 1 of motor 60 are fixed to a motor housing 8. Each stator 1 comprises a stator coil 1a and applies a torque to a rotor 2 according to the receipt of electric power to stator coils 2a. Rotor 2 is fixed to a motor shaft 3 of a cylindrical shape and transmits the torque to a sun gear 10. Both end portions of motor shaft 3 are supported by bearings 4 and 6. More specifically, bearing 4 is fixed to a left end bracket 5 constructing a left end wall of motor 60, and bearing 6 is fixed to a right end bracket 7 constructing a right end wall of motor 60. The arrangement of these bearing 4 and 6 function to equivalently maintain a clearance between stators 1 and rotor 2. This clearance is called an air gap and takes a value smaller than or equal to 1 mm. In this first embodiment, the positions of bearings 4 and 6 are accurately maintained by positioning left and right end brackets 5 and 7 for respectively supporting bearings 4 and 6, with respect to an inner diameter of a motor housing 8 for fixing stator 1. Motor 60 is constructed by stator 1, rotor 2, motor shaft 3, bearings 4 and 6, eng brackets 5 and 7 and motor housing 8. Although the embodiment according to the present invention has been shown and described such that differential speed reducer 70 has a combined structure of a speed reducer and a differential mechanism, the invention is not limited to this and speed reducer 70 may be constructed only by a speed reducer.

Subsequently, there is discussed differential speed reducer 70 which is disposed adjacent to motor 60.

As shown in FIG. 1, the drive unit of the first embodiment employs a planetary gear train type speed reducer as a speed reducer. That is, speed reducer 70 of the planetary gear train type comprises sun gear 10, planet gears 11, a planet carrier 13a, a ring gear 12 and a gear housing 23. By fixing ring gear 12 to gear housing 23, the motor speed inputted to sun gear 10 is reduced and outputted from planet carrier 13a. Planet carrier 13a is a part of a gear carrier 13 for a differential gear train which is constructed by four bevel gears 15, 16, 17 and 18. Bevel gears 15, 16, 17 and 18 are rotated according to the rotation of gear carrier 13. Gear carrier 13 is rotatably supported by gear housing 23 through a bearing 14. Bevel gear 15 of the differential gear train is integrally connected to a left drive shaft 19 extending in the leftward direction in FIG. 1. Bevel gear 17 is integrally connected to a right drive shaft 20 extending in the rightward direction in FIG. 1. When the revolution speed of left drive shaft 19 is as same as that of right drive shaft 20, four bevel gears 15 through 18 are integrally rotated with gear carrier 13 without generating relative revolutions thereamong. When there is a difference between the revolution speeds of left and right drive shafts 19 and 20, the differential gear train absorbs the difference by generating relative revolutions among bevel gears 15, 16, 17 and 18, and equivalently distributes torque to left and right drive shafts 19 and 20. That is, differential speed reducer 70 is constructed by a speed reducer of the planetary gear train type and a differential gear train.

By adjacently disposing motor 60 and differential speed reducer 70, it becomes possible to minimize the transfer loss of the driving force from motor 60 to left and right drive shafts 19 and 20.

Although the first embodiment has been shown and described such that the speed reducer is constructed by a planetary gear train, it will be understood that it may be constructed by a multiple planetary gear train type speed reducer or by a speed reducer constructed by spur gears. Further, the differential gear train may be constructed by a planetary gear train type or other type.

Right drive shaft 20 penetrates an inner space of motor shaft 3, a center hole of right end bracket 7, an inner space of a cylindrical portion 7a integral with right end bracket 7, and reaches a right end of the drive unit of the electric vehicle. A right end portion of right drive shaft 20 is supported by a bearing 24 attached to an end of cylindrical portion 7a. Right end bracket 7 is positioned with respect to the inner diameter of motor housing 8, and bearing 6 for supporting the end portion of motor shaft 3 is fixed to right end bracket 7. Therefore, right drive shaft 20 supported by bearing 24 is supported to maintain a coaxial relationship with motor shaft 3.

Inverter 50 is adjacently disposed around an outer surface of cylindrical portion 7a which right drive shaft 20 penetrates.

A protecting cover 26 of inverter 50 has a function of protecting the parts 25 of inverter 50 from stones bumped from a road surface and splashes, and a function of shielding electromagnetic noises produced by inverter 50. On the other hand, parts 25 of inverter 50 are attached to right end bracket 7 and cylindrical portion 7a as shown in FIG. 1 and integrally supported by right end bracket 7 and cylindrical portion 7a. Since parts 25 are not attached to protecting cover 26, protecting cover 26 may have a proper strength and is preferably made by an electro-conductive material so as to perform an electromagnetic shielding function. Accordingly, it is preferable that protecting cover 26 is made by resin and a metal plating film is attached on an inner surface of protecting cover 26 so as to perform an electromagnetic shielding effect. This arrangement will achieve the light weight of the drive unit of an electric vehicle while maintaining the electromagnetic shielding effect. Protecting cover 26 may be produced by a thin metal sheet having a proper strength. By employing such a thin metal sheet, it also becomes possible to achieve the light weight of the drive unit of an electric vehicle and the electromagnetic shielding effect for inverter 50.

A hole 7b is formed at an outer peripheral surface of right end bracket 7, and a connector 27 is attached to an outer end of hole 7b. Inverter 50 is electrically connected to an electric power source (such as a battery) through connecter 27 and a wire (not shown) penetrating hole 7b so that direct-current electric power necessary for generating a torque is supplied to parts 25 of inverter 50. By this arrangement, it becomes possible to flatten both installation surfaces of right end bracket 7 and protecting cover 26. This arrangement simplifies a shape of protecting cover 26 and makes easy producing protecting cover 26.

As shown in FIG. 1, a structural member 80 of the drive unit in the first embodiment comprises right end bracket 7 (including cylindrical portion 7a) which functions as a right end wall of motor 60 and surrounds right drive shaft 20 penetrating inverter 50, motor housing 8 which functions as an outer peripheral portion of motor 60, left end bracket 8 which functions as a left end wall of motor 60, and gear housing 23 which functions as an outer cover of differential speed reducer 70. This structural member 80 functions as a frame of the drive unit of the electric vehicle and integrally supports motor, 60, differential speed reducer 70 and inverter 50.

Subsequently, there is discussed a heat transfer line using cooling water as refrigerant in inverter 50 and a heat exchanger 30. Generally, cooling water (antifreezing solution), which has a cooling performance higher than that of oil, is employed as refrigerant cooling inverter 60. Herein, a cooling performance includes a heat transfer characteristic.

This cooling water is supplied to inverter 50 and heat exchanger 30 from a heat radiating section (radiator) 35 which is disposed outside of the drive unit and which radiates heat of cooling water into the atmosphere. More specifically, a cooling water inlet 31b is disposed at an outer periphery of right end bracket 7, a cooling water passage 7c is machined in right end bracket 7 and a cooling water passage 29 is disposed so as to directly cool heat generating portions of parts 25 of inverter 50, connected to cooling water passage 7c. Therefore, cooling water is supplied through cooling water inlet 31b to cooling water passage 7c and cooling water passage 29. Since IGBT (Insulated Gate Bipolar Transister) and bypass diode of parts 25 mainly generate heat, these heat generating portions are arranged to directly contact with cooling water flowing through cooling water passage 29. Cooling water passing through cooling water passage 29 is fed to heat exchanger 30 integrally built in structural member 80 disposed under motor 60 and differential speed reducer 70. Cooling water fed to heat exchanger 30 absorbs heat of oil for cooling the motor 60 and differential speed reducer 70 and is then fed to heat radiating section 35 through a cooling water outlet 31a disposed at a cooling water output port. Cooling water is cooled by atmospheric air through heat radiating section 35. The circulation of cooling water is executed by a pump (not shown) disposed outside of the drive unit.

Subsequently, there is discussed the heat radiation of oil in the cooling system of the drive unit according to the present invention. The cooling operation of differential speed reducer 70 is representatively explained through the explanation of cooling the gears of differential speed reducer 70. The cooling operation of motor 60 is representatively explained through the explanations of cooling the stator coils 1a which are the representative heat generating portions and of cooling the motor shaft 3 and bearings 4 and 6. Herein, the cooling of motor 60 means cooling of stator coils 1a, motor shaft 3 and bearings 4 and 6.

Stator coils 1a, which are main heat generating portions of motor 60, are cooled by oil. Oil cooling passages 34 are provided in slots of motor 60 as shown in FIG. 1. By flowing oil through oil passages 34 by means of oil pump 32, the heat generated by stator coils 1a is transferred to oil. Accordingly, by the circulation of oil through an oil cooling passage 28 of heat exchanger 30, the heat transferred from stator coils 1a to oil is transferred into cooling water employed for cooling the inverter 50.

Subsequently, there is discussed a cooling operation of differential speed reducer 70, motor shaft 3 and motor bearings 4 and 6. Lubrication and cooling of differential speed reducer 70, motor shaft 3 and motor bearings 4 and 6 are normally executed using oil.

Oil is supplied to bevel gears 15 through 18 of the differential gear train, sun gear 10, planet gears 11 and ring gear 12 of the planetary gear train type speed reducer, motor shaft 3 and bearings 4 and 6 supporting motor shaft 3 to execute the lubrication and cooling of these elements. Although the cooling of motor shaft 3 is not shown in Figures, this cooling is generally arranged to cool magnets embedded in rotor 2 and may be omitted herein.

Oil circulated by oil pump 32 receives heat of the gears of differential speed reducer 70, motor shaft 3 and bearings 4 and 6 of motor shaft 3, and discharges the heat into cooling water by flowing oil through oil cooling passage 28 of heat exchange 30.

Motor 60 and differential speed reducer 70 are cooled by oil. Oil for cooling the stator coils 1a may be commonly used with oil for cooling the differential speed reducer 70, motor shaft 3 and bearings 4 and 6 of motor shaft 3.

Although the first embodiment shown in FIG. 1 has been shown and described such that the circulation of oil is executed by oil pump 32 attached to heat exchanger 30, it will be understood that a mechanical pump utilizing a rotational force of motor shaft 3 may be employed as an oil pump.

As discussed above, since heat exchanger 30 integrally built in structural member 80 can transfer the heat absorbed by oil into cooling water, it becomes possible to simplify a heat radiating line outside of the drive unit into one line. This enables heat radiating section 35 to be downsized and improves the easiness of mounting the drive unit on an electric vehicle.

Further, in case that oil for cooling stator coils 1a and oil for cooling differential speed reducer 70, motor shaft 3 and bearings 4 and 6 of motor shaft 3 are commonly used, the heat of oil is discharged into cooling water for cooling the inverter 50. Therefore, the temperature of oil for cooling the gears of differential speed reducer 70 and bearings 4 and 6 of motor shaft 3 is lowered, and the durability of these parts are improved.

In addition, as shown in FIG. 1, since heat exchanger 30 is integrally assembled with structural member 80 at a lower portion of the drive unit, it becomes possible to effectively utilize a conventional wasted space of the drive unit, and therefore it is possible to downsize the drive unit totally. Further, since it is possible to dispose heat exchanger 30 in an oil pan 31c set at a lowermost portion of the drive unit of the electric vehicle, heat exchanger 30 can effectively perform as an oil sump and heat exchanger.

Referring to FIG. 2, there is discussed a second embodiment of the drive unit of the electric vehicle in accordance with the present invention. As shown in FIG. 2, inverter 50, motor 60 and differential speed reducer (speed reducer) 70 are aligned sequentially on an axis. In this second embodiment, a cooling system is arranged such that cooling water cools stator coils 1a of motor 60 in addition to inverter 50. As shown in FIG. 2, cooling water inlet 31b and motor cooling-water passages 8a are provided in motor housing 8. As shown by arrows in FIG. 2, cooling water flows from cooling water inlet 31b through motor cooling water passages 8a, cooling water passage 29 and a cooling water passage 30a of heat exchanger 30 to cooling water output 31a in order of mention. Cooling water passage 29 may be extended toward motor 30. The cooling system may be arranged such that cooling water is first supplied to cooling water passage 29. Since stator coils 1a of motor 60 generate a large quantity of heat, by first flowing cooling water through cooling water passages 8a for motor 60, the cooling water effectively absorbs the heat generated by motor 60. Although the second embodiment has been shown and described such that cooling water passages are formed in motor housing 8, the cooling of motor 60 may be executed by providing passages in the slots as shown in FIG. 1 and flowing cooling water through the passages.

In this second embodiment, oil lubricates and cools the gears of differential speed reducer 70, motor shaft 3, bearings 4 and 6 of motor shaft 3. Oil is fed to oil cooling passage 28 of heat exchanger 30 built in structural member 80 disposed at a lower portion of motor 30 and differential speed reducer 70 by means of oil pump 32, and radiates the heat into cooling water. The cooling water absorbs the heat from oil in heat exchanger 30 and is fed to heat radiating section 35 through cooling water outlet 31a to radiate the heat of the cooling water into the atmosphere.

Since the second embodiment according to the present invention is arranged such that differential speed reducer 70, motor shaft 3 and bearings 4 and 6 of motor 60 are cooled by common oil and the heat of the oil is transferred to the cooling water for cooling inverter 50 and stator coils la of motor 60, the temperature of oil for cooling motor shaft 3 and bearings 4 and 6 is lowered. Accordingly, it becomes possible to combine the heat radiating lines into one line while improving the durability of parts. This enables heat radiating section (radiator) 35 to be downsized, and improves the mounting capability of the drive unit on the electric vehicle.

Further, the second embodiment is arranged such that stator coils 1a, which generates large quantities of heat, are cooled by cooling water, and that motor shaft 3, bearings 4 and 6 of motor shaft 3, which generate relatively small quantities of heat, are cooled by oil. Accordingly, it becomes possible to minimize the side of heat exchanger 30 integrally built in structural member 80.

Figure 3:
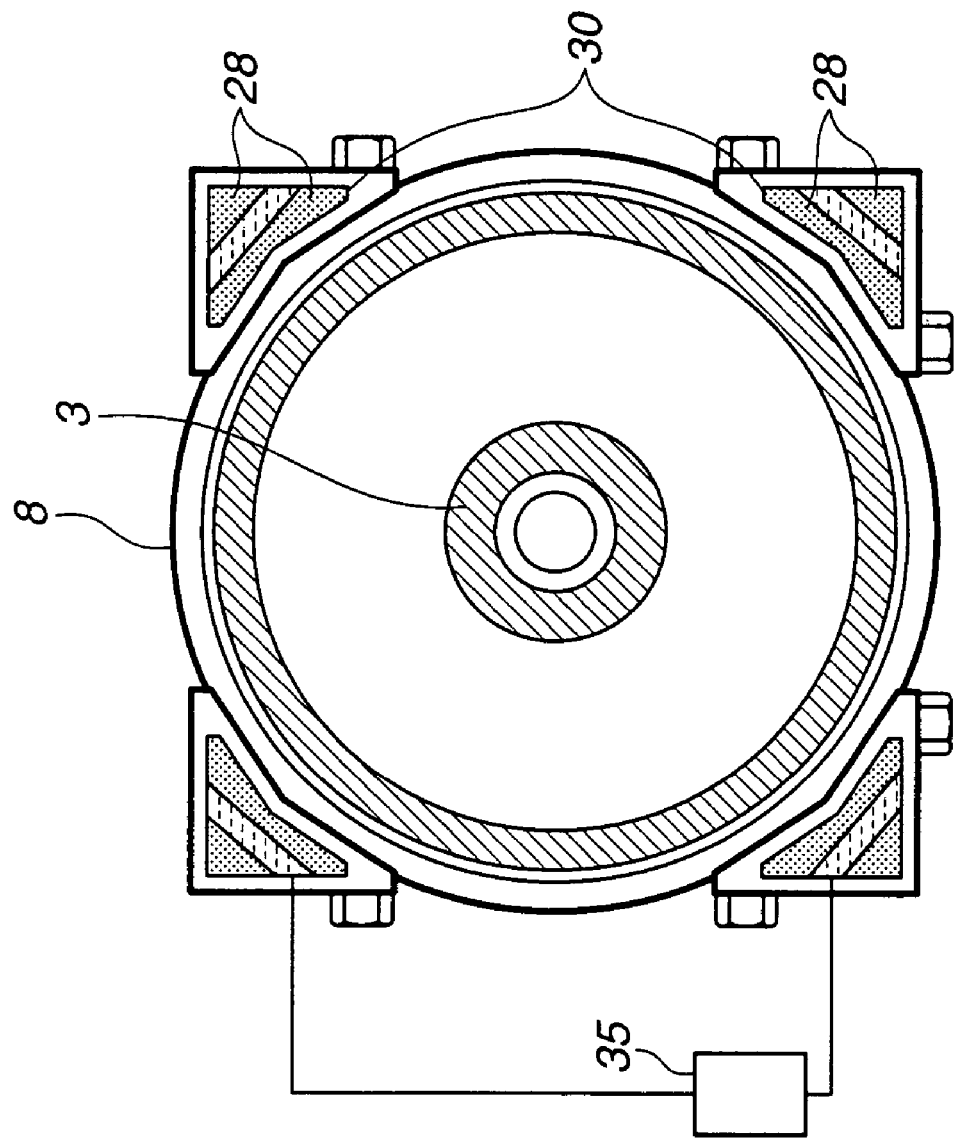
FIG. 3 is a cross sectional view showing the drive unit of a third embodiment according to the present invention.

Referring to FIG. 3, there is discussed a third embodiment of the drive unit for the electric vehicle in accordance with the present invention. This third embodiment is specifically arranged such that heat exchanger 30 is disposed at four corners of a rectangle circumscribed about an outer peripheral circle of motor 60 as shown in FIG. 3, in contrast to the arrangement of the first and second embodiments wherein heat exchanger 30 is built in structural member 80 of a cylindrical shape. This arrangement of heat exchanger 30 at the four corners enables the effective utilization of an wasted space, and enables the downsizing of the drive unit.

This arrangement of heat exchanger 30 at the four corners may be modified according to the desired performance of heat exchanger 30. For example, heat exchanger 30 may be disposed at two or one corner of the rectangle. By utilizing the four corners of the rectangle circumscribed about the outer peripheral circle of motor 60, the drive unit of the third embodiment achieves the maximum space utility.

Figure 4:
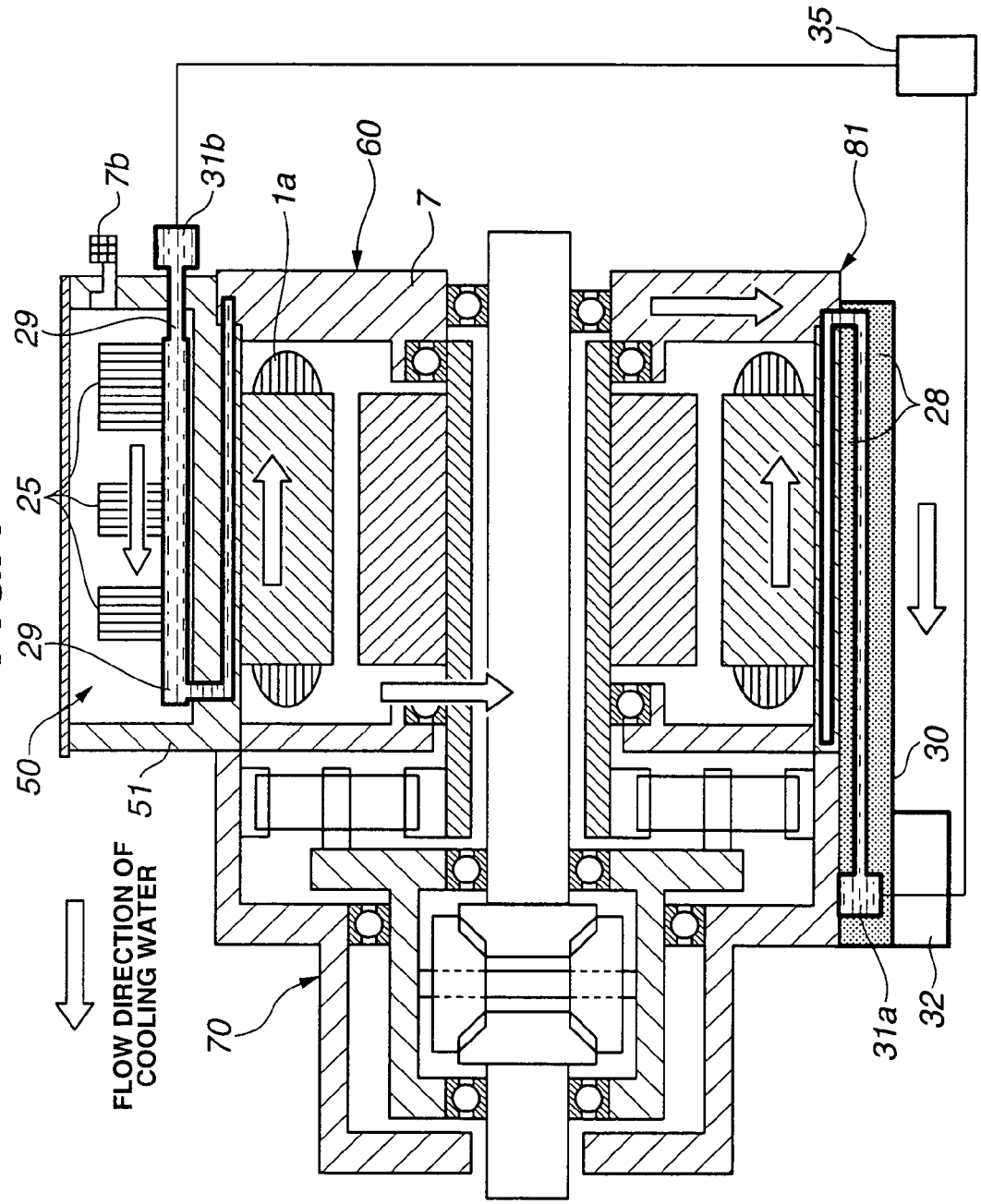
FIG. 4 is a cross sectional view showing the drive unit of a fourth embodiment according to the present invention.

Referring to FIG. 4, there is discussed a fourth embodiment of the drive unit for the electric vehicle in accordance with the present invention. This forth embodiment is specifically arranged such that motor 60 and differential speed reducer (speed reducer) 70 are aligned on an axis and that parts 25 of inverter 50 are received in an inverter housing 51 which is attached on motor 60. More specifically, inverter 50 is disposed in parallel with motor 60. This arrangement also enables heat radiating section (radiator) 35 to be downsized, and improves the mounting capability of the drive unit on the electric vehicle.

The fourth embodiment is further arranged such that structural member 81 comprises right end bracket 7 functioning as a right end wall of motor 60, motor housing 8 functioning as an outer peripheral portion of motor 60, left end bracket 6 functioning as a left end wall of motor 60, gear housing 23 functioning as an outer shell of differential speed reducer 70, and an inverter housing 51 surrounding inverter 50. This structural member 81 functions as a frame of the drive unit of the electric vehicle, and integrally supports motor 60, differential speed reducer 70 and inverter 50.

In FIG. 4, inverter 50 and stator coils 1a of motor 60 are cooled by cooling water, and a flow pass of the cooling water is represented by arrows in FIG. 4. More specifically, the cooling water is fed from cooling water inlet 31 formed at inverter housing 51 through cooling water passage 29 for cooling inverter 50 to a passage in motor housing 8 for cooling the stator coils 1a of motor 60. Thereafter, cooling water cools oil which has received the heat of the gears of differential speed reducer 70, motor shaft 3 and bearings 4 and 6 of motor shaft 3 at heat exchanger 30. More specifically, heat of oil flowing through oil cooling passage 28 is transferred to cooling water flowing through cooling water passage in heat exchanger 30. Thereafter, the cooling water received the heat is supplied to heat radiating section 35 through cooling water outlet 31a and radiates the heat into the atmosphere through heat radiating section 35.

The fourth embodiment according to the present also posses the advantages gained by the second embodiment.

Figure 5:
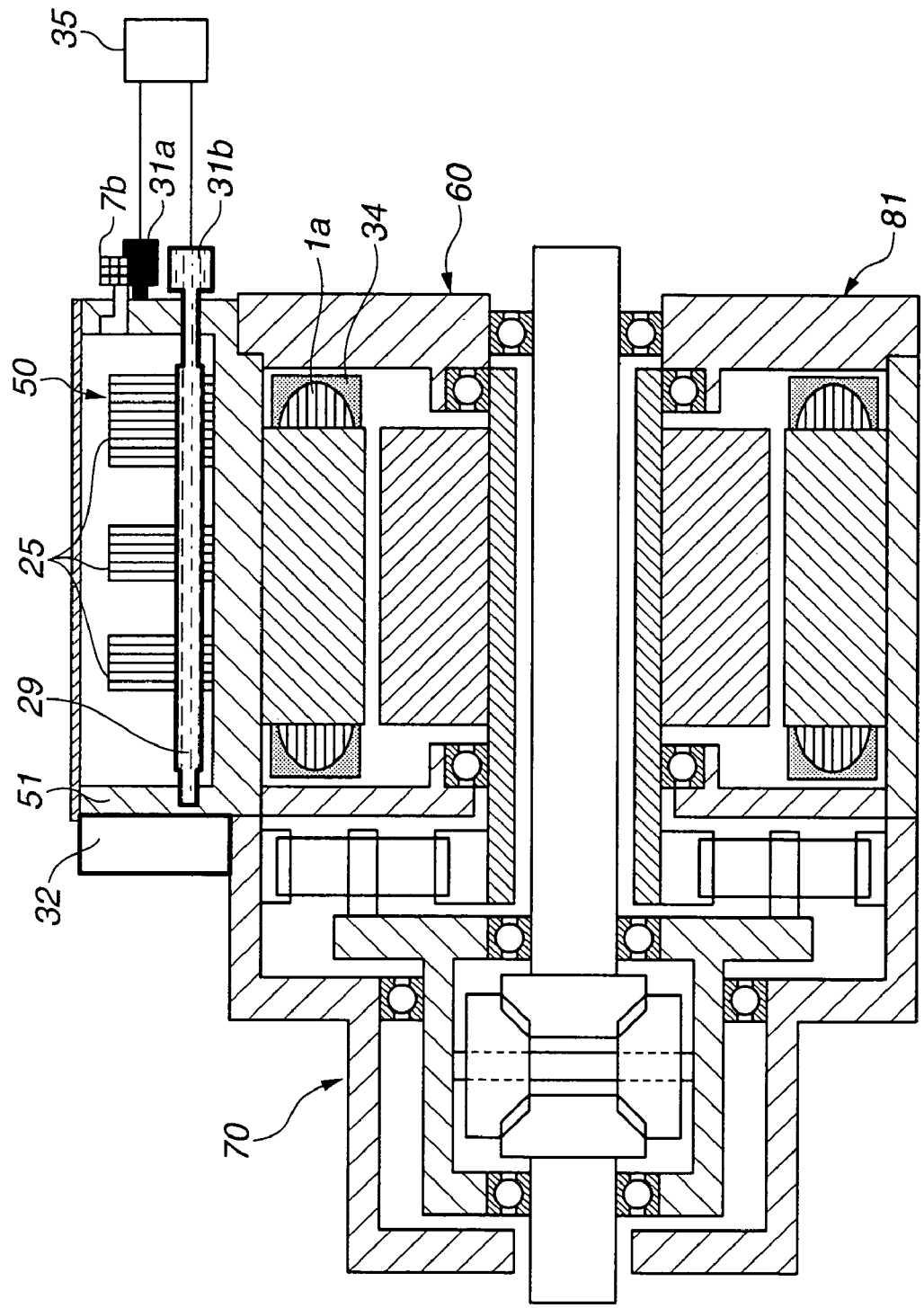
FIG. 5 is a cross sectional view showing the drive unit of a fifth embodiment according to the present invention.

Referring to FIG. 5, there is shown a fifth embodiment of the drive unit of the electric vehicle in accordance with the present invention. The fifth embodiment is arranged such that motor 60 and differential speed reducer (speed reducer) 70 are adjacently aligned on an axis. Parts 24 of inverter 50 are received in inverter housing 51. Heat exchanger 30 is attached to a side wall of inverter housing 51 and is integrally built in structural member 81 so that inverter housing 51 is disposed in parallel with motor 60.

In this fifth embodiment, cooling water cools inverter 50 and oil flowing through heat exchanger 30.

Stator coil 1a, which main generates heat in motor 60, is cooled by oil. As shown in FIG. 5, oil passage 34 is provided at slots of motor 60, and oil circulated by oil pump 32 is fed to oil passage 34. By this oil flowing, the heat generated by stator coils 1a is transferred to oil flowing through oil passage 34. Further, the heat transferred to oil is transferred to cooling water in heat exchanger 30.

Motor 60 and differential speed reducer 70 are cooled by oil through oil passage 34 at slots of motor 60. The oil flowing through heat exchanger 30 is commonly used with oil for cooling and lubricating the gears of differential speed reducer 70, motor shaft 3 and bearings 4 and 6 of motor shaft 3 and is circulated by oil pump 32. The heat transferred to oil from motor 60 and differential speed reducer 70 is radiated into cooling water through heat exchanger 30.

On the other hand, cooling water is supplied from cooling water inlet 31b provided at inverter housing 51 and flows through cooling water passage 29 to cool parts 25 of inverter 50. Further, cooling water receives the heat from oil in heat exchanger 30 installed at a side portion of inverter housing 51, and radiates the received heat at heat radiating section 35 into the atmosphere by being fed to heat radiating section 35 through cooling water outlet 31a.

The fifth embodiment according to the present also posses the advantages gained by the second embodiment.

Figure 6:
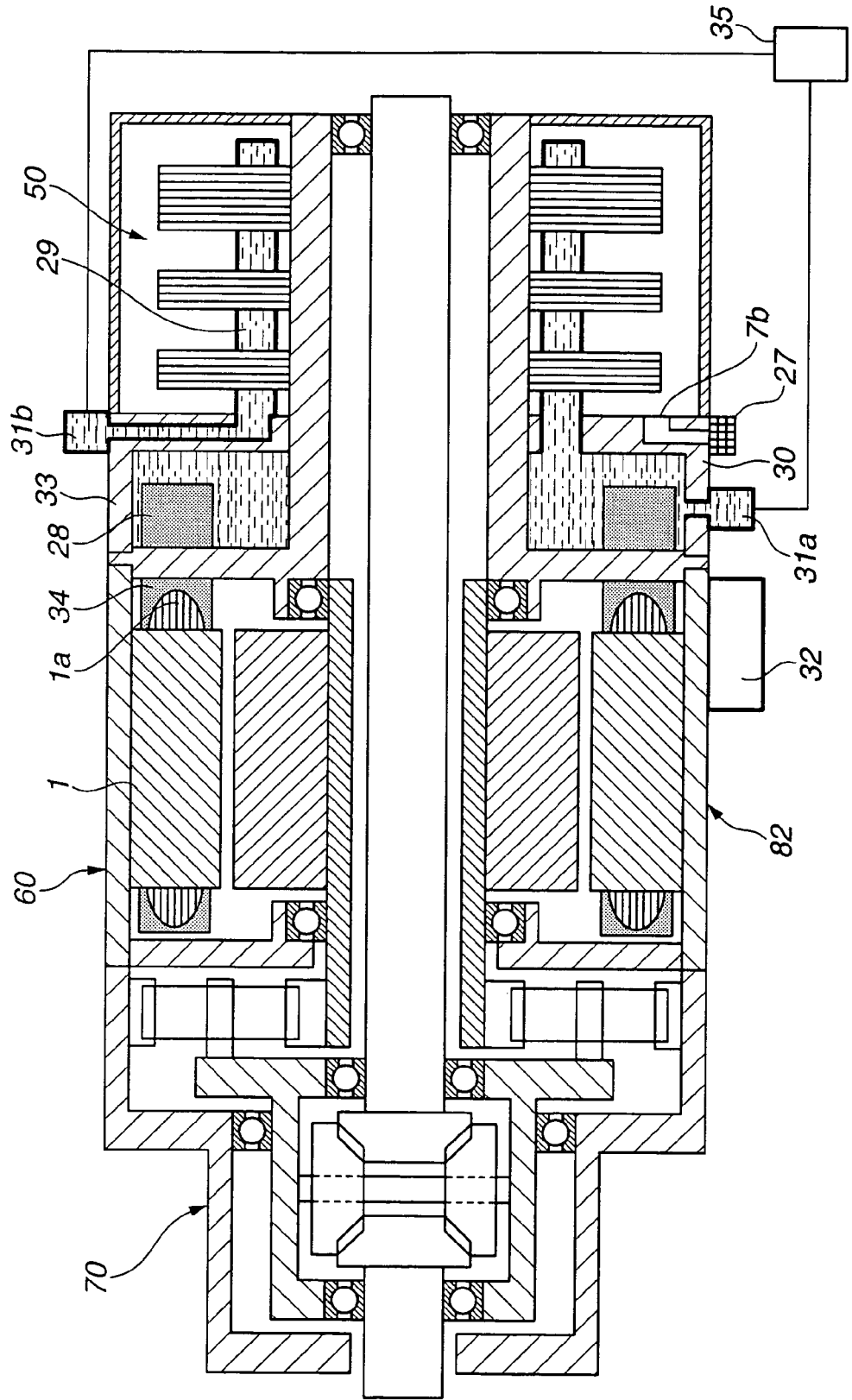
FIG. 6 is a cross sectional view showing the drive unit of a sixth embodiment according to the present invention.

Referring to FIG. 6, there is discussed a sixth embodiment of the drive unit of the electric vehicle in accordance with the present invention. As shown in FIG. 6, heat exchanger 30 is disposed between inverter 50 and motor 60. Further, inverter 50, heat exchanger 30, motor 60 and differential speed reducer 70 are adjacently aligned on an axis, and are integrally supported by structural member 82. Structural member 82 comprises right end bracket 7 (including a cylindrical portion 7a) which functions as a right end wall of motor 60 and surrounds right drive shaft 30 penetrating inverter 50, motor housing 8 which functions as an outer peripheral portion of motor 60, left end bracket 5 which functions as a left end wall of motor 60, and a heat exchanger housing 33 which is a shell of heat exchanger 30. This structural member 82 functions as a frame of the drive unit and integrally supports motor 60, differential speed reducer 70, inverter 50 and heat exchanger 30 as an integral structure.

With the thus arrangement of the sixth embodiment according to the present invention, since heat exchanger 30 having a relatively heavy weight is employed as a structural member, it becomes possible to reduce a total weight of the drive unit. This arrangement eliminates the need for a new structural member for heat exchanger 30.

In FIG. 6, cooling water is entered in the drive unit from cooling water inlet 31b and flows through a passage formed in heat exchanger housing 33 and cooling water passage 29 to cool inverter 50. Then, cooling water receives heat from oil cooling passage 28 at heat exchanger 30 and flows out from cooling water outlet 31a. Thereafter, the flowed-out cooling water is fed to heat radiating section 35 provided outside of the drive unit to radiate the heat of cooling water into the atmosphere.

Subsequently, there is discussed a cooling operation of stator coils 1a executed by oil. Oil receives the heat of stator coils 1a at oil passages 34 provided in slots of motor 50. Since oil passages 34 are directly connected to oil cooling passage 28 of heat exchanger 30, the heat transferred to oil at oil passage 34 is directly radiated into cooling water in heat exchanger 30. This arrangement enables cooling water for cooling the inverter 50 and oil for cooling the motor 60 to be connected via a shortest distance so as to effectively execute the heat transfer from oil to cooling water. Therefore it becomes possible to downsize the drive unit.

In this sixth embodiment, motor 60 and differential speed reducer 70 are cooled by oil, and oil for cooling stator coils 1a is commonly used with oil for cooling and lubricating a mechanical system including gears of differential speed reducer (speed reducer) 70, motor shaft 3 and bearings 4 and 6 of motor shaft 3. Oil pump 32 collects oil for cooling and lubricating a mechanical system including the gears of differential speed reducer 70, motor shaft 3 and bearings 4 and 6 of motor shaft 3, and fed the oil to oil passages 34 in the slots so that the oil is cooled by cooling water in heat exchanger 30.

Although the embodiments according to the present invention have been shown and described such that heat exchanger 30 integrally assembled with structural member of the drive unit is disposed at a lower portion of motor 60, aligned with motor 60, disposed at four corners of the rectangle circumscribed with an outer peripheral circle of motor 60 or at one of the four corners, the arrangement of heat exchanger 30 is not limited to these arrangements and may employ the combination of these discussed arrangements. The size of heat exchanger 30 is basically determined according to the generated heat quantity of inverter 50, motor 60 and differential speed reducer 70 although it is varied according to the performance thereof.

While the embodiments according to the present invention have been shown and described to employ cooling water and oil as refrigerants, the invention is not limited to this and may be adapted to a case wherein other two kinds of refrigerants having different cooling performances are employed.

This application is based on Japanese Patent Application No. 2003-47083 filed on Feb. 25, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A drive unit for an electric vehicle, comprising:
a motor;
an inverter supplying alternating current electric power to the motor;
a speed reducer reducing a revolution speed of a mechanical output of the motor, the speed reducer comprising a differential gear train distributing the mechanical output of the motor into left and right driving shafts;
a structural member integrally holding the motor, the inverter, and the differential gear train;
first refrigerant receiving heat of at least the motor and outputting the heat into the atmosphere, wherein the first refrigerant includes cooling water and passes through a first refrigerant passage having a first passage section and a second passage section, the first passage section in contact with at least the motor;
second refrigerant receiving heat of at least the speed reducer and outputting the heat to the first refrigerant, a cooling performance of the first refrigerant being higher than a cooling performance of the second refrigerant, wherein the second refrigerant passes through a second refrigerant passage; and
a heat exchanger transferring the heat of the second refrigerant to the first refrigerant, the heat exchanger being integrally built in the structural member, being disposed under the drive unit constituted by the motor, the inverter, and the differential gear train, and including the second passage section being disposed within an inside of the second refrigerant passage, and wherein the first passage section is disposed away from the second refrigerant passage.

2. The drive unit as claimed in claim 1, wherein the motor, the inverter and the speed reducer are aligned on an axis, the first refrigerant cooling the inverter, and the second refrigerant cooling the motor and the speed reducer.

3. The drive unit as claimed in claim 1, wherein the motor, the inverter and the speed reducer are aligned on an axis, the first refrigerant cooling a stator coil of the motor and the inverter, and the second refrigerant cooling a motor shaft of the motor and the speed reducer.

4. The drive unit as claimed in claim 1, wherein the motor and the speed reducer are aligned on an axis, the inverter being disposed in parallel with the motor, the first refrigerant cooling the inverter, and the second refrigerant cooling the motor.

5. The drive unit as claimed in claim 1, wherein the motor and the speed reducer are aligned on an axis, the inverter being disposed in parallel with the motor, the first refrigerant cooling the inverter, and the second refrigerant cooling the motor and the speed reducer.

6. The drive unit as claimed in claim 1, further comprising a heat radiating section disposed outside of the structural member, the heat radiating section radiating the heat of the first refrigerant into the atmosphere.

7. The drive unit as claimed in claim 1, wherein the heat exchanger is integrally assembled with the motor, the inverter and the speed reducer through a structural member.

8. The drive unit as claimed in claim 1, wherein the heat exchanger is integrally assembled at a lower portion of the motor and the speed reducer through a structural member.

9. The drive unit as claimed in claim 7, wherein the heat exchanger is disposed in at least one of four corners of an imaginary rectangle circumscribed with an outer peripheral circle of the motor.

10. The drive unit as claimed in claim 1, wherein the heat exchanger is disposed between the motor and the inverter and is aligned with the motor and the inverter.

11. The drive unit as claimed in claim 10, wherein the heat exchanger functions as the structural member.

12. The drive unit as claimed in claim 1, wherein the motor is disposed adjacent to the speed reducer.

13. The drive unit as claimed in claim 1, wherein the heat exchanger comprises a sump for receiving the second refrigerant which has received heat of at least the speed reducer, and the first refrigerant passage which is in contact with the second refrigerant in the sump and in which the first refrigerant flows.

14. The drive unit as claimed in claim 1, wherein the second refrigerant includes oil.

15. A drive unit for an electric vehicle, comprising:
a motor;
an inverter electrically connected to the motor, the inverter supplying alternating current electric power to the motor;
a speed reducer connected to the motor, the speed reducer reducing a revolution speed of a mechanical output of the motor; and
a cooling system comprising
a first refrigerant passage having a first passage section and a second passage section, for a first refrigerant, the first passage section in contact with at least the motor, wherein the first refrigerant includes cooling water,
a second refrigerant passage in contact with at least the speed reducer,
a heat exchanger connected to the first refrigerant passage and the speed reducer,
a radiating section connected to the first refrigerant passage and the heat exchanger, the radiating section configured for radiating heat into the atmosphere,
the first refrigerant for circulating in the first refrigerant passage, the heat exchanger, and radiating the heat at the radiating section,
a second refrigerant for circulating in the second refrigerant passage and the heat exchanger, the second refrigerant receiving heat at the second refrigerant passage and the heat exchanger,
wherein the second passage section of the first refrigerant passage is disposed inside the second refrigerant passage, and the first passage section is disposed away from the second refrigerant passage, and
wherein the heat exchanger is integrally assembled with the motor, the inverter, and the speed reducer, the heat exchanger comprises a sump for receiving the second refrigerant which has received heat of at least the speed reducer, and the second passage section of the first refrigerant passage is in contact with the second refrigerant in the sump.

16. The drive unit as claimed in claim 15, wherein the second refrigerant passage includes surfaces of gears of the speed reducer.

* * * * *